Nov. 13, 1956 K. F. MOLLER 2,770,352
DEVICE FOR ORIENTING AND FEEDING ARTICLES
Filed Oct. 29, 1951 2 Sheets-Sheet 1
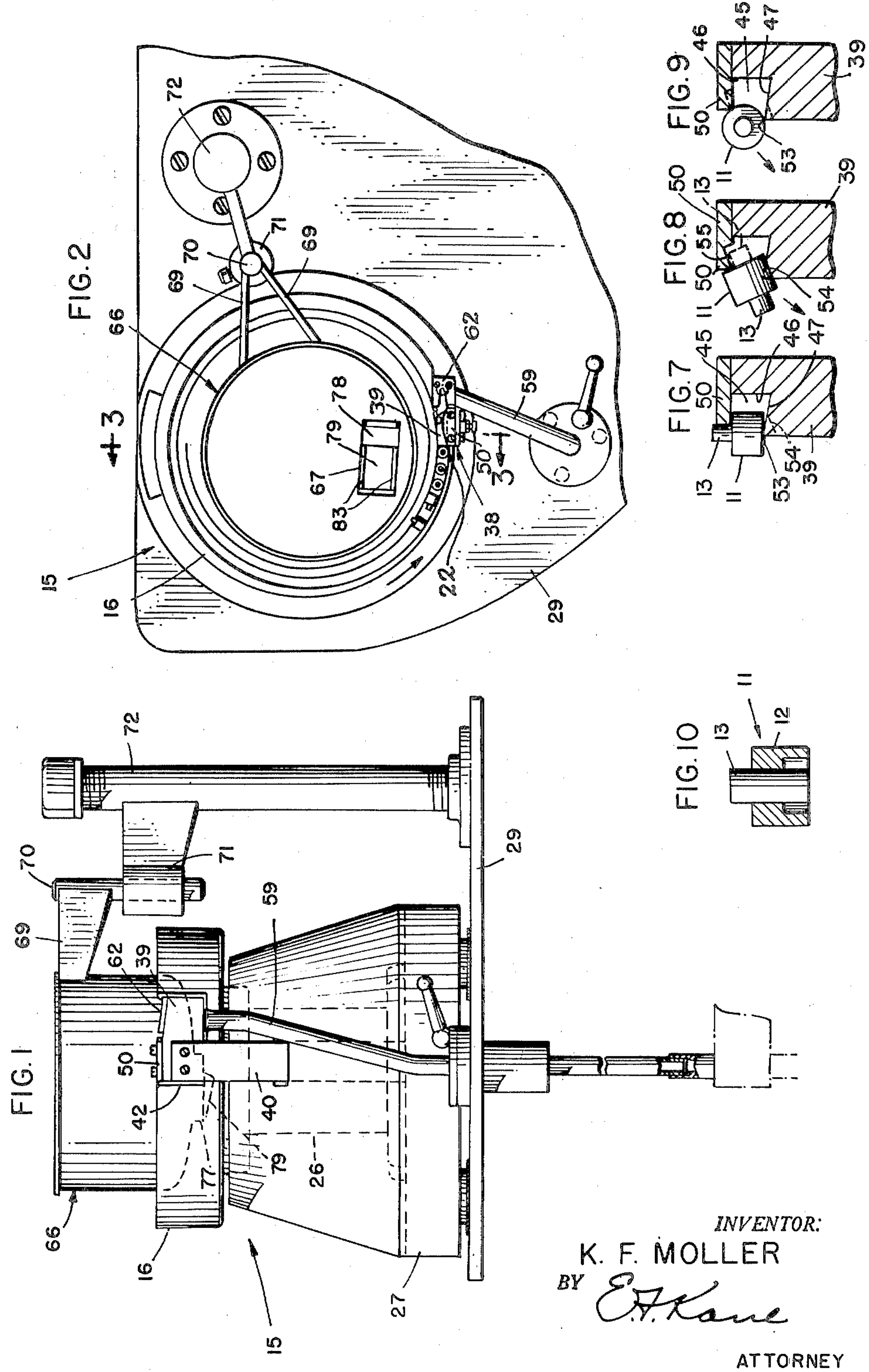
*INVENTOR:*
K. F. MOLLER
*BY* E. A. Kane
ATTORNEY DEVICE FOR ORIENTING AND FEEDING ARTICLES
Filed Oct. 29, 1951 2 Sheets-Sheet 2
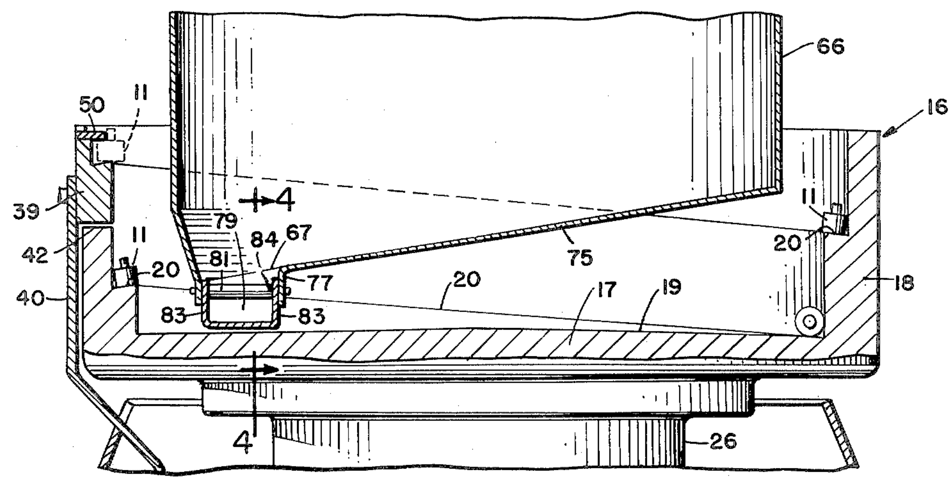
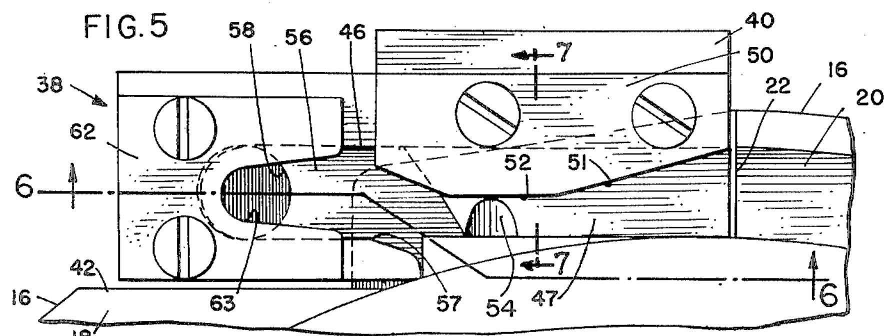
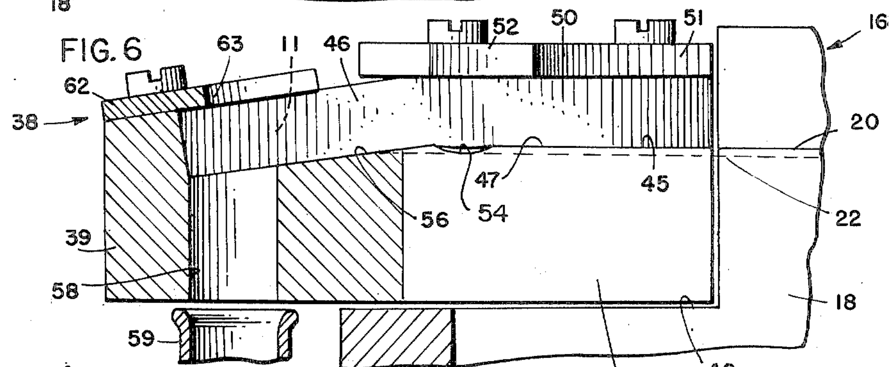
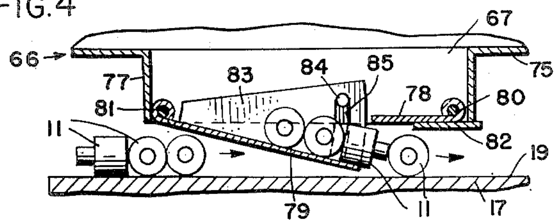
*INVENTOR:*
K. F. MOLLER
*BY* E. F. Kane
ATTORNEY

United States Patent Office 2,770,352
Patented Nov. 13, 1956

1

2,770,352

DEVICE FOR ORIENTING AND FEEDING ARTICLES

Kasper F. Moller, Chicago, Ill., assignor to Western Electric Company, Incorporated, New York, N. Y., a corporation of New York Application October 29, 1951, Serial No. 253,659

8 Claims. (Cl. 198—54)

This invention relates to an article feeding device and more particularly to a hopper-type feeding device for orienting and feeding relatively fragile cylindrical articles.

One type of commercial feeding device has a circular bowl which is oscillated about a vertical axis through a relatively short angular traverse to impart movement to the parts supplied thereto and has a feed track which slopes upwardly from the bottom wall of the bowl in a spiral path for guiding the articles for advancing movement therealong to its discharge end. The bowl of this type of feed device has a limited capacity for holding articles and does not work satisfactorily when a large supply of articles is applied thereto. Also, when a large supply of articles of relatively fragile material is supplied to the bowl and subjected to this type of vibratory feeding movement for a substantial period of time, damage to the articles frequently results.

It is an object of the present invention to provide a device for supplying a controlled amount of articles to an article feeding apparatus.

It is a further object of the invention to provide, in an article feeding apparatus, a device for orienting the articles fed thereby.

The invention contemplates the provision of a stationary supply hopper for holding a quantity of the articles and dispensing means at the lower end of the supply hopper for discharging the articles as needed into the bowl of an article feeding apparatus in which the bowl is oscillated at a relatively rapid frequency through a relatively short angular distance to advance the articles in a circular path. The bowl has a peripheral track sloping upwardly from the bottom wall of the bowl in a spiral path for guiding the articles upwardly thereon to a discharge point and into a gravity feed chute. The dispensing means at the bottom of the supply hopper comprises an outlet in the bottom of the hopper through which the articles are adapted to flow from the hopper into the bowl and a swinging door hinged to the hopper and movable downwardly to open position to permit the escape of articles from the hopper, and movable upwardly by the articles in the bowl to closed position to stop the escape of articles from said hopper when a sufficient number of the articles have been fed into the bowl. Cam means near the end of the upwardly sloping feed track engage successive articles as they advance and eject all of the improperly positioned articles back into the bowl, allowing only the articles which are properly positioned to advance into the gravity feed chute.

Other objects and advantages of the invention will become apparent by reference to the following detailed description thereof and the accompanying drawings illustrating a preferred embodiment of the invention, in which—

Fig. 1 is a side elevational view of the article feeding apparatus embodying the present invention;

Fig. 2 is a plan view of the apparatus shown in Fig. 1;

Fig. 3 is a vertical sectional view through a portion of the feeding apparatus taken along the line 3—3 of Fig. 2;

Fig. 4 is a detailed vertical sectional view taken on the line 4—4 of Fig. 3;

Fig. 5 is an enlarged plan view of a portion of the feeding device rotated 180° with respect to Fig. 1 and showing the terminal end of the feed track and the elements for ejecting all except the properly positioned cylindrical articles being advanced on the feed track;

Fig. 6 is a vertical sectional view taken on the line 6—6 of Fig. 5;

Figs. 7, 8, and 9 are cross-sectional views taken on the line 7—7 of Fig. 5 showing the mechanism for ejecting the improperly positioned parts from the feed track and indicating the various positions of the cylindrical articles thereon; and Fig. 10 is a central sectional view of the article being fed in the present device.

The present feeding device is designed to feed cylindrical articles 11 (Fig. 10) comprising a hollow cylindrical porcelain block 12 into the aperture in the bottom wall of which is cemented a cylindrical carbon block 13, one end of which is substantially flush with the one end of the porcelain block, and the other end of which extends beyond the other end of the porcelain block.

In the drawings, 15 indicates a movable hopper-type feeding apparatus comprising a hopper bowl 16 having a bottom wall 17 and a cylindrical wall 18 extending upwardly from the periphery thereof. The upper surface 19 of the bottom wall 17 slopes gently downward from the center thereof and the bowl has a feed track 20 which slopes progressively upwardly from the outer edge of the surface 19 in a spiral path through approximately 1½ convolutions and terminates at a point 22 adjacent the top edge of the hopper bowl. The hopper bowl 16 is fixed to an actuating device diagrammatically indicated at 26, Fig. 1, mounted on a base 27 which is supported on a horizontal plate or table 29. The actuating mechanism 26 serves to oscillate the hopper bowl 16 about a vertical axis coaxial with the axis of the bowl at a predetermined frequency through a relatively short angular traverse with a relatively slow forward movement and a quick return movement. Under the influence of the oscillating movement of the hopper bowl, the articles 11 positioned in the bottom of the hopper are caused to move outwardly from the center thereof and to be moved in a counter-clockwise direction as viewed from above with the result that the outermost articles 11 on the bottom of the hopper are advanced up the sloping arcuate feed track 20. Thus, successive articles will be advanced in various positions relative to each other from the bottom of the hopper along the entire length of the feed track. The feeding device 15 thus far described is a commercial and well-known product.

Means 38 are provided adjacent the terminal end 22 of the feed track 20 for ejecting the improperly positioned articles 11 and allowing the advancement of only those articles 11 which are resting on their flat end surface with the carbon rod 13 projecting upwardly from the article and for guiding the articles thus positioned into a gravity feed tube. The selecting and rejecting means 38 comprises a stationary block 39 fixed to a supporting bracket 40 which is secured to the stationary base 27. The block 39 fits into a recess 42 formed in the bowl 16 and is spaced from the adjacent surfaces of the bowl to provide clearance for the oscillating movement of the bowl. A longitudinally extending track 45 defined by the vertical and transverse surfaces 46 and 47, respectively, forms a continuation of the feed track 20 of the hopper bowl 16. A cam plate 50 secured to the upper portion of the block 39 has a portion thereof overhanging the track 45 of the guide member 39 as shown in Figs. 5–9. The plate 50 with surfaces 51 and 52 thereon is positioned in a predetermined relation to the supporting surface 47 and the edge 53 thereof to move successive articles 11 outwardly from the surface 46 and cause the ejection of all of the articles 11 which are not positioned on the feed track with the projecting end of the carbon rod 13 extending upwardly (see Figs. 8 and 9) and to permit the forward movement of the articles 11 positioned with the projecting portion of the carbon rod 13 extending upwardly (Fig. 7). A slight arcuate notch or recess 54 is formed in the surface 47 of the guide block 39 to aid in the ejection of the articles 11 when they are positioned on their sides as shown in Fig. 8. An arcuate undercut or recess 55 in the cam plate 50 provides clearance for the projecting portion of the carbon block 13 during the ejecting of the article 11 when the article 11 is positioned with the projecting portion of the carbon rod 13 under the plate 50.

The articles 11 which are properly positioned are advanced along the track 45 onto a downwardly sloping wall 56 and engage a vertical guide wall 57 disposed in spaced relation to the wall 46 and forming a channel therewith for guiding the article 11 into alignment with a bore 58 through which the article may drop into a stationary feed tube 59. To prevent the tipping of the articles 11 as they approach the aperture 58 and to position them in alignment with the aperture and thus prevent them from obstructing the entrance of the aperture, a guide plate 62 is secured to the upper end portion of the guide block 39. The guide plate 62 has a slot 63 therein, the end of which is adapted to engage the projecting portion of the carbon rod 13 of the article 11 and limit the forward tipping movement of the article. After an article reaches the aperture 58 and tips slightly forward so that the projecting portion of the carbon rod 13 engages the end of the slot 63, continued movement of the succeeding articles will advance the tilted article and straighten it into axial alignment with the aperture 58 whereupon it will drop therethrough into the tube 59. The tube 59 is stationarily mounted on the table 29 and serves to guide the articles onto apparatus for processing the articles.

The article feeding apparatus 15 operates to feed the articles most satisfactorily and effectively when a limited supply of the articles, not exceeding one layer of articles, is in the bowl 16. Means are provided for holding a relatively large supply of articles and feeding them into the bowl in small amounts as needed. For this purpose a stationary hopper 66 capable of holding a relatively large supply of the articles 11 is positioned with its lower end within the bowl 16. The hopper 66 has a restricted outlet 67 and a dispensing or control mechanism for feeding the articles into the bowl 16 as needed to maintain a restricted substantially constant supply of articles 11 therein. The supply hopper 66 has a bracket 69 and a rod 70 fixed thereto, the latter being removably secured in a socket member 71 on a stationary post 72 to support the hopper in a predetermined stationary position relative to the bowl 16.

The bottom wall 75 of the supply hopper 66 is sloped to direct the articles toward one side thereof and into the discharge opening 67 which has a rectangular tubular member or chute 77 extending downwardly therefrom. The bottom end of the tubular member 77 is closed by a pair of plates or doors 78 and 79 hinged at 80 and 81, respectively, to opposite walls of the chute 77. The door 78 is adapted to swing upwardly and is supported in a normal horizontal position by a stop 82 secured to the chute 77. The door 79 is adapted to swing downwardly into engagement with or in close proximity to the upper surface 19 of the hopper bowl 16 and has a pair of side walls 83—83 which are turned upwardly for sliding engagement with the side walls of the chute 77. A stop pin 84 may be provided on one of the walls of the chute to engage in a slot 85 in one of the side walls 83 to limit the downward movement of the door 79.

The supply hopper 66 is supported at an elevation to position the lower end of the chute 77 and the doors 78 and 79 at a predetermined distance from the surface 19 of the bottom wall of the hopper bowl 16, which distance is slightly greater than the height or diameter of the articles 11. With a supply of articles in the hopper bowl 16 sufficient to form a single layer, the articles 11 will advance underneath the outlet chute 77 and maintain the door 79 in its upper closed position. When the supply of articles 11 in the hopper bowl 16 is reduced so that the articles no longer hold the trap door 79 in its upper position, the trap door 79 will drop to open position to allow some of the articles in the supply hopper 68 to pass into the bowl 16. The articles 11, after a sufficient number thereof has been released from the supply hopper 68 to cover a substantial portion of the bottom thereof, will be advanced by the hopper bowl 16 along the surface 19 into engagement with the door 79 and cause it to be moved upwardly to its closed position. Any articles positioned on and overhanging the lower edge portion of the door 79 as it is moved upwardly to a closed position will engage the movable plate 78 and cause the plate 78 to be moved upwardly with the articles. Thus, with the construction shown, in which the plate 78 is pivoted for upward movement, the door 79 may be moved upwardly to its closed position without any interference or obstruction to this movement from any articles thereon and the other parts of the device adjacent thereto.

From the above description, it will be seen that the present device provides a vibratory-type article feeding apparatus in which the bowl 16 is vibrated or oscillated to impart advancing movement to the articles and cause them to advance in an arcuate path along the sloping feed track 20 and that those articles which are improperly positioned will be ejected from the feed track 20 and will be returned to the bottom of the bowl and only those articles 11 which are positioned with the projecting portion of the carbon rod 13 extending upwardly will be advanced to the gravity feed passageway 58. It will also be seen that with the stationary auxiliary supply hopper 68 a large supply of articles may be held therein and fed to the hopper bowl 16 in small quantities as needed, and that while the articles are supported in the supply hopper 68 they are not subjected to the vibratory motion of the hopper bowl 16. Thus, the fragile porcelain shells 12 of the articles 11 are held relatively free of movement except for normal downward movement as they pass out of the supply hopper 66 into the bowl 16 and a minimum number of the articles 11, which are dispensed to the hopper bowl 16, are subjected to the vibratory motion of the hopper bowl 16.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In an article feeding device having a movable member with a substantially horizontal surface for supporting and advancing a layer of articles thereon in a circular path, the combination therewith of a stationary hopper for holding a supply of said articles, said hopper having an outlet for said articles positioned a distance slightly greater than the dimension of the article above the article supporting surface of said movable member to permit a single layer of said articles to be advanced therebeneath by said member, and a door pivotally supported on said hopper and movable to an upper position to close said outlet and a lower position to open said outlet for the passage of a single layer of said articles from said hopper onto said member, said door being moved to its upper position by the articles advanced thereunder.

2. In an article feeding device having a bowl oscillatable about a vertical axis and provided with a substantially horizontal surface for supporting and advancing articles thereon in a circular path and provided with a peripheral feed track along which said articles are moved, the combination therewith of a stationary hopper for holding a supply of said articles, said hopper having an outlet for said articles positioned above the article supporting surface of said movable member a distance slightly greater than the dimension of the article to permit a layer of said articles to be advanced therebeneath by said member, a door pivotally supported on said hopper and movable to and from an upper position to close said outlet and a lower position to open said outlet for the passage of said articles from said hopper into said bowl, said door being raised by the articles advanced in said bowl under said door to close said outlet, and means for limiting the downward movement of said door.

3. In an article feeding device having a bowl movable to advance articles therein in an arcuate path and having an arcuate feed track along which said articles are moved, the combination therewith of a stationary hopper for containing a supply of said articles and having an opening disposed above and in proximity to said bowl for the passage of articles therethrough, a member yieldably mounted in said hopper for movement to and from a normal position and cooperating with said hopper to define said opening, a door hinged to said hopper in the opening thereof for movement to and from a normal lower position in spaced relation to said yieldable member to form an outlet in said hopper for the articles, said door being movable to an upper position in close proximity to said yieldable member to close said outlet by the movement of the articles in said bowl, said yieldable member being adapted to be moved from said normal position by an article overhanging a portion of said door in response to the movement of said door to said upper position.

4. In an article feeding device having a bowl movable to advance articles therein in an arcuate path and having a feed track along which said articles are moved, the combination therewith of a stationary hoper for containing a supply of said articles, said hopper having an opening for the movement of articles therethrough disposed above and in proximity to said bowl, a pair of plates hinged to said hopper movable to and from a substantially horizontal position with their free ends adjacent each other for closing said outlet, one of said plates being movable downwardly to open position to provide an outlet for the flow of articles from said hopper into said bowl and to said horizontal position by the movement of the articles in said bowl to stop the flow of articles from said hopper, said other plate being movable upwardly by an article overhanging an edge portion of said one plate in response to the movement of said one plate to said horizontal position.

5. A device of the character described comprising a bowl oscillatable about a vertical axis to advance articles therein in an arcuate path and having a feed track along which said articles are moved, a stationary hopper for containing a supply of said articles, said hopper having an opening for the movement of articles therethrough disposed above and in proximity to said bowl, a pair of plates hinged to said hopper movable to and from a substantially horizontal position with their free ends adjacent each other for closing said outlet, one of said plates being movable downwardly to open position to provide an outlet for the flow of articles from said hopper into said bowl, means limiting the downward movement of said one plate, said one plate being movable to said horizontal position by the movement of the articles in said bowl, said other plate being movable upwardly by an article overhanging an edge portion of said one plate in response to the movement of said plate to said horizontal position.

6. In a device having a track movable back and forth for feeding cylindrical parts, each of which has one end portion of one diameter and the other end portion of a reduced diameter, the combination with said movable track of a stationary guide member having a track positioned in close proximity and in alignment with one end of said movable track to form a continuation thereof for guiding the parts as they are advanced, means on said guide member for ejecting from the track thereon the parts not positioned upright on their enlarged ends, said stationary guide member having a downwardly disposed bore in said track for receiving and guiding successive parts therein for downward movement, and a guide plate on said member having surfaces thereon engageable with the upper reduced end portions of said parts for positioning the upper end portions of said parts in axial alignment with said bore.

7. In an article feeding device having a track movable back and forth for feeding cylindrical parts, each of which has one end portion of one diameter and the other end portion of a reduced diameter and wherein the length of said one end portion is less than the diameter thereof, the combination with said movable track of a stationary guide member having a track positioned in close proximity to and in alignment with one end of said movable track to form a continuation thereof for guiding the parts as they are advanced, a cam plate positioned on said stationary member in a predetermined relation above said track to pass the cylindrical parts positioned upright on their enlarged ends and to cam from the track parts which are not positioned upright on their enlarged ends, said stationary guide member having a downwardly directed bore in alignment with said track for receiving and guiding successive parts therein for downward movement, and a guide plate on said member having surfaces thereon engageable with the upper reduced end portions of said parts for positioning the upper end portions of said parts in alignment with said bore.

8. In an article feeding device having a track movable back and forth for feeding cylindrical parts, each of which has one end portion of one diameter and the other end portion of a reduced diameter and wherein the length of said one end portion is less than the diameter thereof, the combination with said movable track of a stationary guide member having an upwardly extending wall and a part supporting surface extending transversely therefrom forming a track positioned in close proximity to and in alignment with said movable track to form a continuation thereof for guiding the parts as they are advanced, said part supporting surface of said track having a lateral edge portion over which the parts may be moved to eject the parts from the track, a cam plate on said stationary member positioned above the supporting surface of said track a distance greater than the length and less than the diameter of said one end portion of said part to pass the cylindrical parts positioned upright on their enlarged ends and to cam from the track parts which are not positioned on their enlarged ends, said stationary guide member having a downwardly directed bore in said track for receiving and guiding successive parts therein for downward movement, and a slotted guide plate on said member having surfaces thereon engageable with the upper reduced end portions of said parts for guiding and stopping the upper end portions of said parts in axial alignment with said bore.

References Cited in the file of this patent

UNITED STATES PATENTS

| | | |
|---|---|---|
| 1,195,571 | Flaherty | Aug. 22, 1916 |
| 1,313,990 | Jackson | Aug. 26, 1919 |
| 1,353,136 | Alberti | Sept. 21, 1920 |
| 2,060,182 | Dellaree | Nov. 10, 1936 |
| 2,065,319 | Lewis | Dec. 22, 1936 |
| 2,332,790 | Gantzer | Oct. 26, 1943 |
| 2,397,610 | Lennon | April 2, 1946 |
| 2,433,561 | Angell | Dec. 30, 1947 |
| 2,576,693 | Oehler | Nov. 27, 1951 |
| 2,609,914 | Balsiger | Sept. 9, 1952 |
| 2,661,833 | Spurlin | Dec. 8, 1953 |

FOREIGN PATENTS

| | | |
|---|---|---|
| 262,526 | Germany | July 15, 1913 |
| 61,035 | Norway | June 26, 1939 |